Aug. 27, 1968  R. A. SPYRA  3,398,824
ORIENTING MECHANISM
Filed March 24, 1967  3 Sheets-Sheet 2

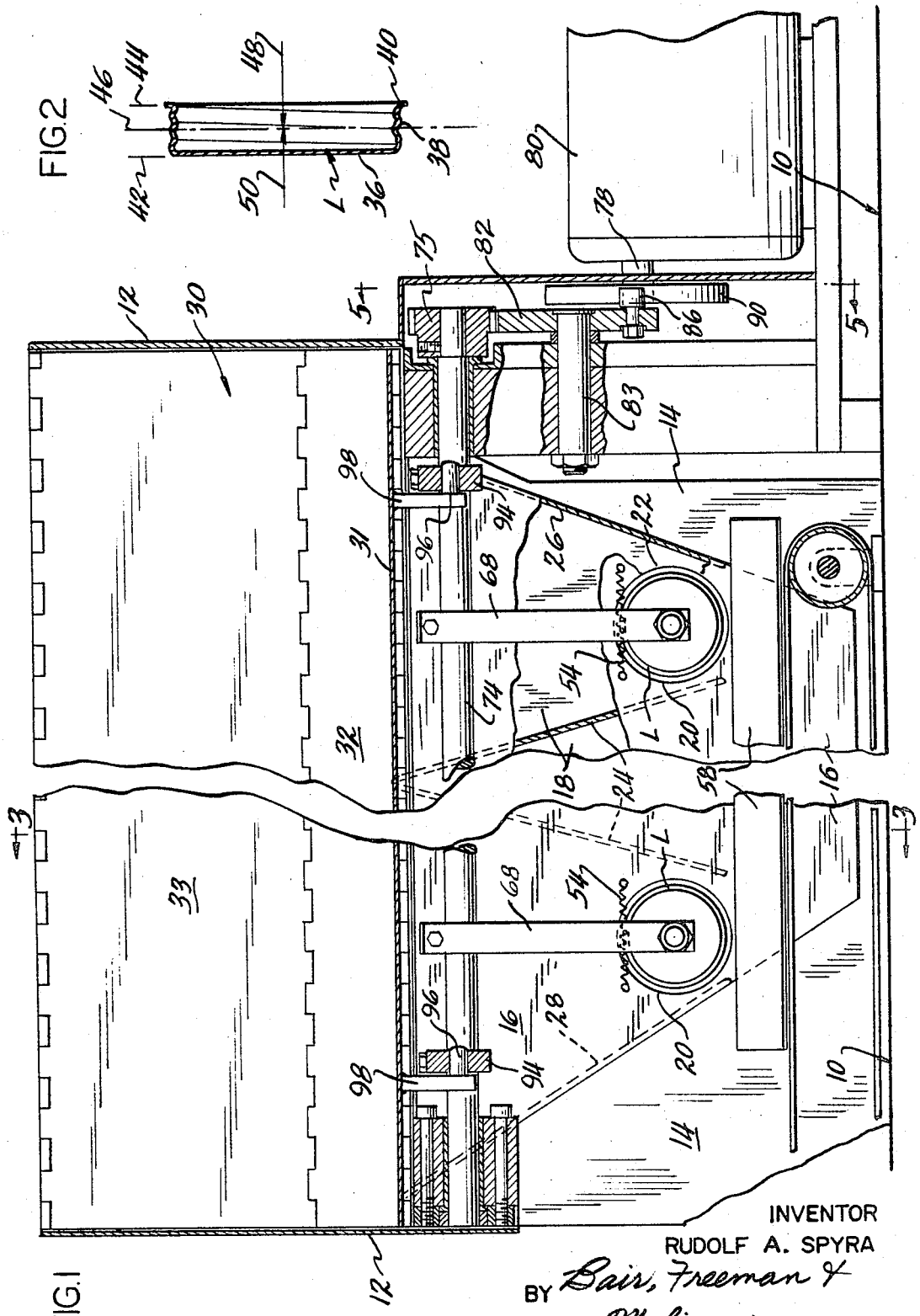

INVENTOR
RUDOLF A. SPYRA
BY *Dair, Freeman & Molinare* ATTORNEYS.

Aug. 27, 1968    R. A. SPYRA    3,398,824
ORIENTING MECHANISM

Filed March 24, 1967    3 Sheets-Sheet 3

INVENTOR
RUDOLF A. SPYRA
BY *Bair, Freeman & Molinare*
ATTORNEYS.

United States Patent Office 3,398,824
Patented Aug. 27, 1968

3,398,824
ORIENTING MECHANISM
Rudolf A. Spyra, % Burghof Engineering and Mfg. Co.,
1720 W. Diversey, Chicago, Ill. 60614
Filed Mar. 24, 1967, Ser. No. 625,744
13 Claims. (Cl. 198—33)

ABSTRACT OF THE DISCLOSURE

Mechanism operable to orient dished articles received randomly from a hopper (such as jar lids) so that they all issue from the mechanism in open-side-down position. The mechanism includes hinged hopper sections and means for manipulating them to properly feed the articles to the orienting mechanism.

One object of the invention is to provide orienting mechanism for jar lids and the like wherein the lids are fed into a delivery trough in a vertical attitude with the top wall of the lid randomly facing in either of two opposite directions, the mechanism being operable to knock the lid out of the delivery chute open-side down in either case.

Another object is to provide a delivery chute with opposite openings slightly larger than the lid so that the lid can be knocked through either of the openings, a knocker arrangement being provided which knocks first in one direction and then the other but in either case engages only that lid which is top-side toward the knocker so that when the lid is knocked from the delivery chute it lands on a conveyor open-side down.

Still another object is to provide a modified form of orienting mechanism in which vacuum cups coact with the tops of the lids for pulling the lids from the delivery chute through either of two opposite openings thereof depending upon which way the lid is present in the delivery chute, means being provided for releasing the lids from the vacuum cups whereupon the lids gravitate down a pair of discharge chutes wherein the lids are in opposed positions in the two chutes, the discharge chutes being provided with means for reorienting the lids with respect to each other.

A further object is to provide constraining means for the lids while in the delivery chute and aligned with opposite openings therein so that the lids are constrained against self-discharge from either opening but which constraining means permits either knock-out or vacuum pull-out of the lid when engaged by the knocker or the vacuum cup respectively.

Still a further object is to provide an "unscrambler" type of hopper having at least one side formed in three sections hinged together and the top and bottom edges hingedly mounted, means being provided for oscillating one of the sections so that all three sections during operation disturb the lids and cause them to readily enter the delivery chute.

With these and other objects in view, my invention consists in the construction, arrangement and combination of the various parts of my orienting mechanism whereby the objects above contemplated are attained, as hereinafter more fully set forth, pointed out in my claims and illustrated in detail on the accompanying drawings, wherein:

FIG. 1 is a vertical sectional view through an orienting mechanism embodying my present invention, part of the mechanism being shown in side elevation.

FIG. 2 is a sectional view through a dished article such as a lid for a screw-top jar, and includes reference to certain orienting operations as will hereinafter appear.

Figure 3:
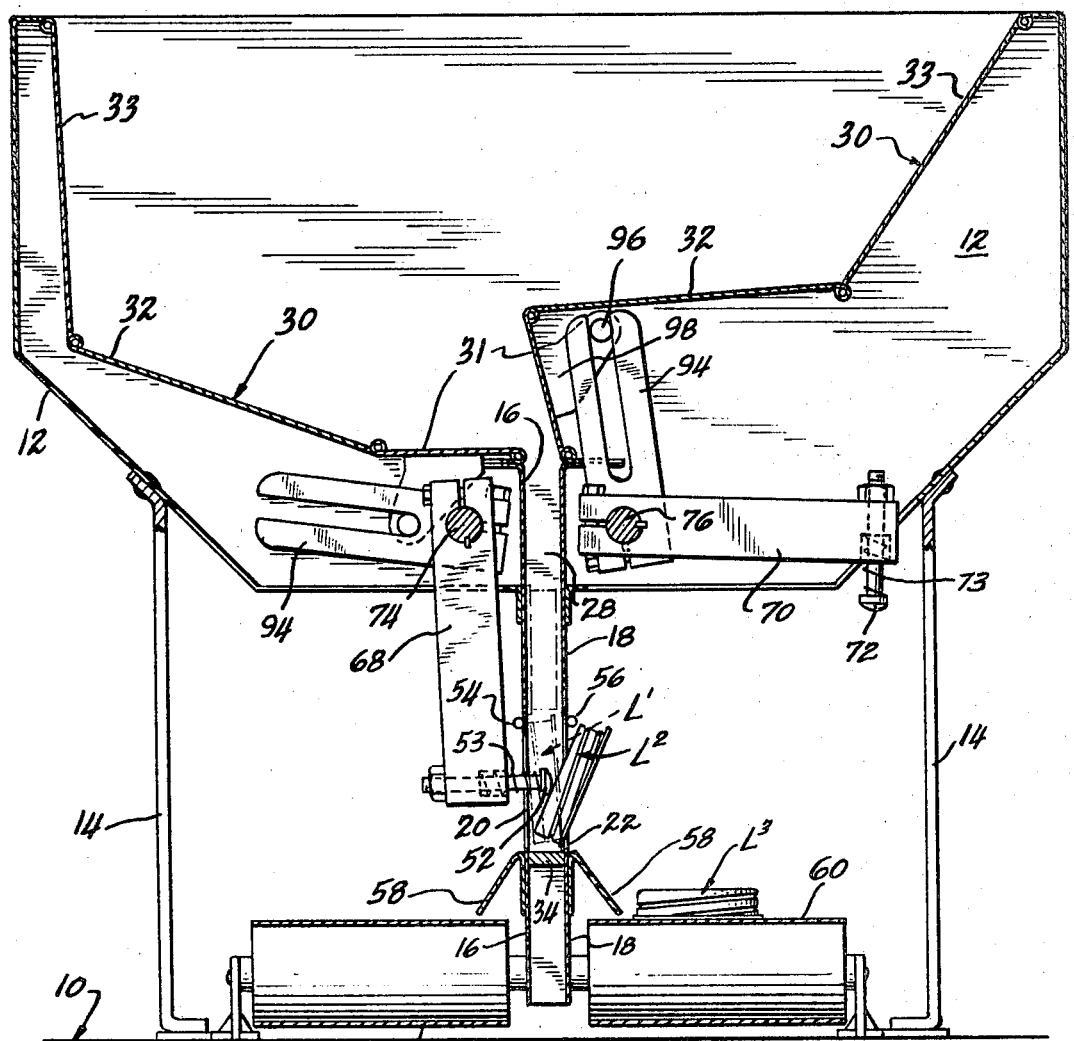
FIG. 3 is a vertical sectional view through my orienting mechanism as taken on the line 3—3 of FIG. 1, FIG. 1 being taken on the 1—1 of FIG. 3.

On the accompanying drawings I have used the reference numeral 10 to indicate a horizontal supporting surface such as a table, frame or the like adapted for supporting my orienting mechanism. A hopper 12 adapted to randomly receive dished articles such as jar lids or the like is supported relative to the surface 10 by supporting walls 14.

A delivery chute extends downwardly from the central portion of the hopper 12 and comprises chute side walls 16 and 18 spaced from each other slightly more than the thickness of the articles to be oriented. An opening 20 is provided in the chute side wall 16 and an opposite opening 22 is provided in the chute side wall 18. The openings 20 and 22 are of such size as to be compatible to the sizes of the articles being oriented as will hereinafter appear. Guide partitions 24 shown particularly in FIG. 1 and chute end walls 26 and 28 complete the construction of the delivery chute 16, 18.

The hopper 12 is provided with a pair of hopper side walls shown generally at 30, each side wall being formed in three sections indicated 31, 32 and 33. The three sections extend in tandem from the upper end of the hopper 12 to the upper end of the delivery chute 16, 18, being hinged to the latter as shown in FIG. 3. The side edges of the sections 32 are also hinged to the adjacent side edges of the sections 31 and 33 as illustrated in FIG. 3.

The purpose of hinging the sections 31, 32, and 33 as disclosed is to permit their manipulation for unscrambling the lids dumped randomly into the hopper by jostling them into the delivery chute 16, 18. The mechanism for manipulating the hopper wall section will be hereinafter disclosed.

Before proceeding with further description of my orienting mechanism, reference is made to FIG. 2 in which one example of a dished article suitable for orienting by my mechanism is disclosed. A screw cap is illustrated and indicated generally as at L. It is of the type to be used on a screw top jar. It comprises a top wall element 36, a screw-threaded periphery 38 and a flange 40. The plane of the top wall is shown at 42 and the plane of the bottom at 44. Midway between the planes 42 and 44 is a center line 46.

If the lid L is held in the vertical position illustrated it is obvious that a knocker element or the like traveling in the direction of the arrow 48 and stopping at or near the center line 46 will not engage the wall element 36. A knocker element traveling from the left however in the direction of the arrow 50 would engage the wall element 36 and knock the lid toward the right. Conversely a lid which arrives at the orienting station in the opposite direction would be knocked according to the left (arrow 48).

Returning now to the delivery chute 16, 18 as shown in FIG. 3, a lid at the dotted position L¹ may be knocked toward the right to the position L² by a knocker 52 and will then fall by gravity to the horizontal position shown at L³. The lid is held in the vertical position, even though it is in alignment with the opposite openings 20 and 22, by a pair of light coil springs 54 and 56 which act as means to constrain the lids against self-discharge from either opening, the springs being located across only a small upper portion of the lid L as shown in FIG. 2. The lid $L^2$ in FIG. 3 has been knocked by the knocker 52 pass the spring to permit discharge of the lid from the delivery chute. The delivery chute is provided with a pair of deflectors 58 to insure proper falling of the lids onto one or the other of a pair of conveyor belts 60.

Figure 4:
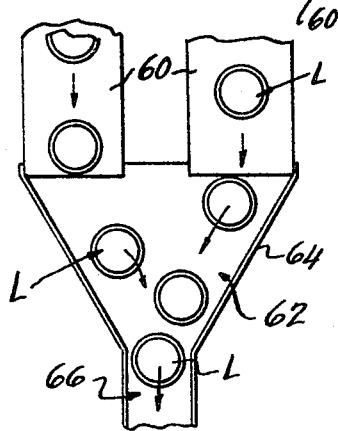
FIG. 4 is a diagrammatic plan view of a pair of conveyors and collecting trough for the oriented lids.

As shown in FIG. 4 the conveyor belts may discharge into a collecting chute 62 having angularly disposed side walls 64 directing the lids toward a narrower chute 66 along which the lids advance in single file, or alternatively a conveyor instead of a chute may be provided with angularly disposed deflectors similar to the walls 64 for deflecting the lids toward single-file disposition on such conveyor.

Returning to FIG. 3, a second knocker 72 is provided. The knockers 52 and 72 are resiliently mounted by means of light springs 53 and 73 on knocker arms 68 and 70 respectively. The arm 68 is mounted on a rock shaft 74 and the arm 70 is mounted on a rock shaft 76.

Figure 5:
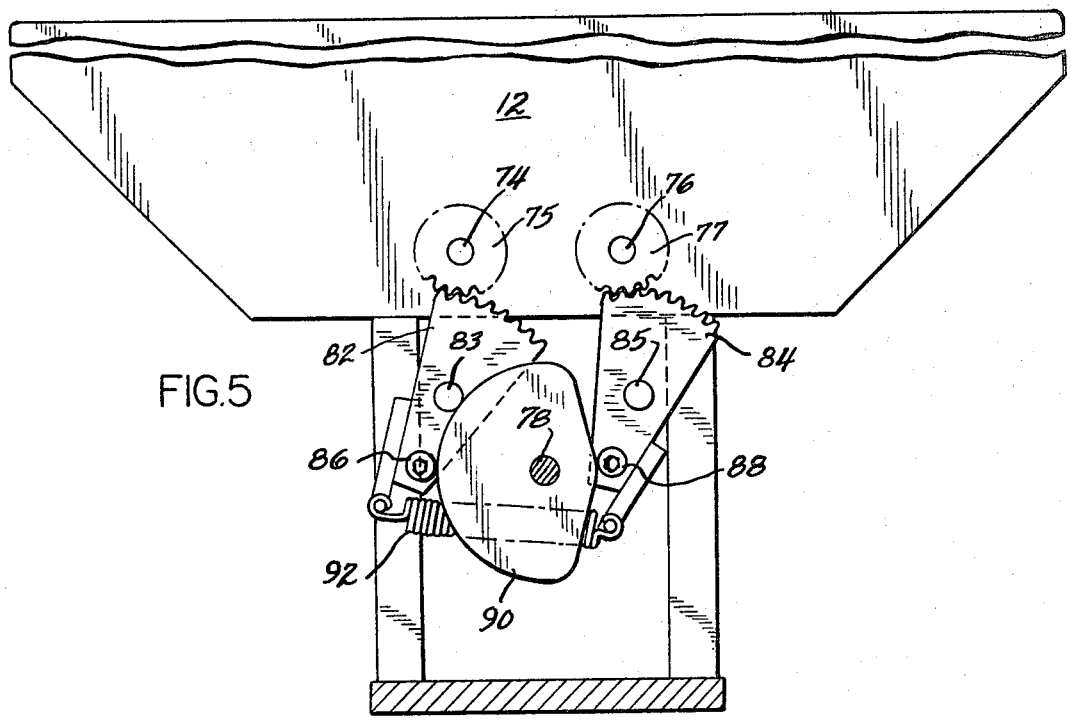
FIG. 5 is a vertical detail sectional view on the line 5—5 of FIG. 1 to show actuating mechanisms of the apparatus.

The rock shafts 74 and 76 are simultaneosuly rocked by suitable mechanism (such as that shown in FIG. 5) from a rotating shaft 78 which may be rotated by a motor and step down gearing unit 80 shown in FIG. 1. The rock shafts 74 and 76 have pinions 75 and 77 secured thereto which mesh with gear sectors 82 and 84 pivoted at 83 and 85.

The gear sectors are in turn rocked by a cam 90 co-acting with rollers 86 and 88 carried by the sectors 82 and 84 respectively, a spring 92 being provided to constrain the rollers 86 and 88 into contact with the cam surface of the cam 90. Accordingly, rotation of the shaft 78 and thereby the cam 90 results in oscillation of the gear sectors 82 and 84 and consequent rocking of the shafts 74 and 76 and the knocker arms 68 and 70 carried thereby.

The arrangement just described it is obvious will cause the knockers 52 and 72 to be alternately entered into the delivery chute 16, 18 so that any lid L therein (in the position shown as $L^1$ in FIG. 3) will be knocked toward the right by the knocker 52 but this knocker will not affect a lid reversely positioned. Such lid however will be knocked toward the left by the knocker 72, and in either case the lid will land on one or the other of the conveyors 60, always in the upright position shown for the lid $L^3$.

The rocking of the shafts 74 and 76 is also utilized to manipulate the hopper side sections 31, 32 and 33. This is accomplished by providing a slotted arm 94 secured to each rock shaft, their slots slidably coacting with pins 96 carried by brackets 98 secured to the hopper side wall sections 31 as shown in FIG. 3. The operative connection just described results, upon rocking of the shafts 74 and 76, in movement of the hopper side wall sections 31 back and forth between a substantially horizontal position shown in the left half of FIG. 3 and a substantially vertical position shown in the right half thereof. At the same time the hinged connection between the sections 31 and 32 and also the hinged connections between the sections 32 and 33 cause the sections 32 and 33 to move between the limit positions shown, thereby producing a substantial agitating action on the lids deposited in the hopper and causing them to be so shuffled about that they readily gravitate down the delivery hopper 16, 18 and keep the hopper filled between the partitions 24 and the end walls 26 and 28 shown in FIG. 1.

It will be noted that the central portion of FIG. 1 is broken away indicating that the orienting mechanism can be of any desired length and have any number of orienting units, only two of which are shown in FIG. 1. Thus, the mechanism can be built to supply oriented lids at any desirable rate depending upon the requirements of one or more lidding machines.

Figures 6, 7:
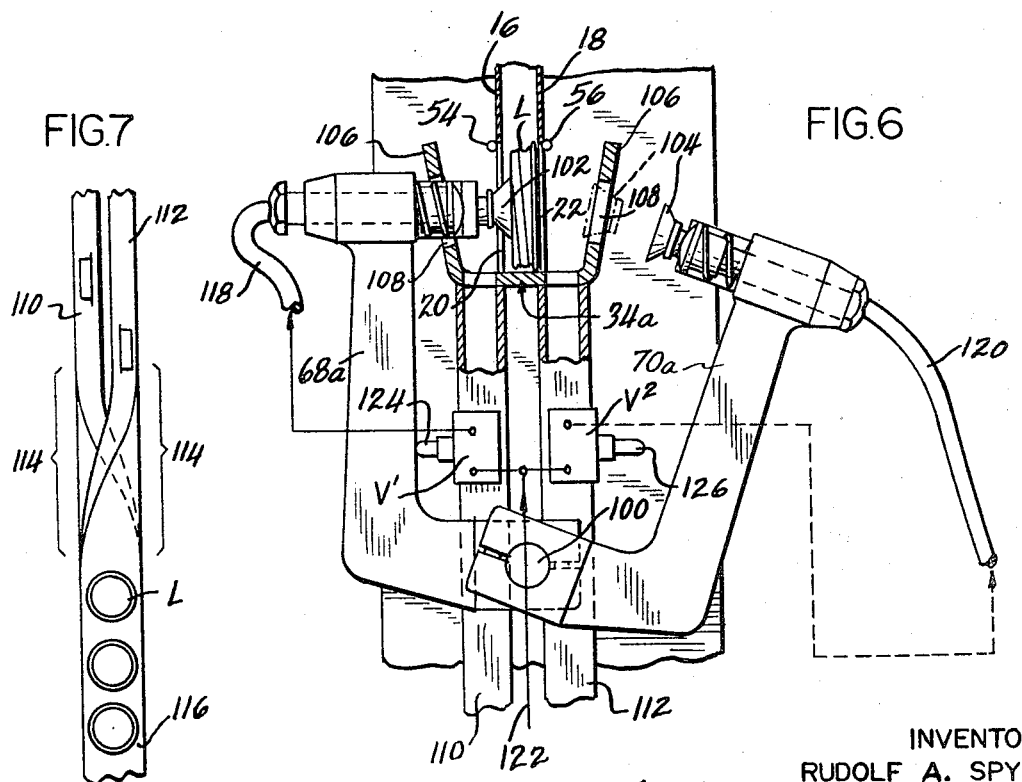
FIG. 6 is a sectional view somewhat similar to FIG. 3 showing a modified form of orienting mechanism.
FIG. 7 is a diagrammatic elevation of a pair of discharged chutes illustrated in FIG. 6 and being substantially a continuation of the lower end thereof.

A modification is shown in FIG. 6 wherein a single rock shaft 100 has a pair of arms 68a and 70a mounted thereon and carrying vacuum cups 102 and 104 which are spring biased to extended positions. The same delivery chute 16, 18 is provided with the same opposite openings 20 and 22 but the stop wall (shown here as 34a) has further stop walls 106 provided with openings 108 through which the vacuum cups 102 and 104 may be projected to enter the delivery chute 16, 18. Discharge chutes 110 and 112 are adapted to receive the lids L oriented in a manner similar to the mechanism already described except the lids are vacuum cup-extracted from the delivery chute in one direction instead of being knocked out of the chute in the opposite direction.

In the continuation of the chutes 110 and 112 shown diagrammatically in FIG. 7 it will be noted that the chutes are provided with twisted sections 114 which give a 90° twist in one direction for the chute 110 and a 90° twist in the other direction for the chute 112. The lids are shown diagrammatically superposed on the discharge chutes and it will be noted their open sides face each other in the chutes 110 and 112. In other words they are oppositely oriented in the chutes. However, after passing through the twisted sections 114 all lids are oriented in the same direction and adapted to enter a common chute 116 from which they are supplied single-file to the lidding machine.

In FIG. 6 vacuum hoses 118 and 120 are illustrated for connection to the vacuum cups 102 and 104, and are controlled by normally-closed valves $V^1$ and $V^2$ respectively. A vacuum line 122 extends to the valves $V^1$ and $V^2$. The valves are provided with actuating plungers which may be engaged by the arms 68a and 70a for producing vacuum at the cups 102 and 104 only between the limits illustrated by the vacuum cup 102 and a dotted position of the vacuum cup 104. Accordingly, soon after either vacuum cup is projected through its openings 108, the cup is operable to engage and hold a lid with which it engages until the lid is extracted to a position close to the stop wall 106 whereupon the vacuum is released and the lid will engage the wall and permit the vacuum cup to move on to its outer position, and the lid will gravitate into its respective chute 110 or 112.

I have found that an orienting mechanism constructed and operated in accordance with the foregoing disclosure is quite effective without attention from an operator to unscramble lids dumped into the hopper, and delivers them in proper oriented position. The lids may thus be automatically supplied to lidding machines instead of the lids having to be supplied by hand thereto.

Some changes may be made in the construction and arrangement of the parts of my orienting mechanism without departing from the real spirit and purpose of my invention, and it is my intention to cover by my claims any modified forms of structure or use of mechanical equivalents which may reasonably be included within their scope.

I claim as my invention:

1. An orienting mechanism for dished articles having off-center wall elements comprising a hopper adapted to receive a plurality of such articles, a delivery chute extending downwardly from the bottom of said hopper down which the articles successively gravitate in vertical attitude, said delivery chute having opposite discharge openings slightly larger than the articles, means to stop an article substantially in alignment with said opposite discharge openings, means to constrain said article against self-discharge from either of said opposite openings, and means for moving articles arriving at said opposite discharge openings through one or the other thereof comprising a pair of opposed knockers, one at each side of said delivery chute and adapted to be moved into said delivery chute, said knockers being adapted to engage said off-center wall elements during back and forth movements of said knockers, the limits of said knockers into said delivery chute being such that they will engage said off-center wall elements only when the dished sides of said articles face away from said knockers, said articles thereupon falling by gravity to a substantially horizontal attitude with their dished sides downward.

2. An orienting mechanism for dished articles according to claim 1 wherein means is provided for actuating said knockers so that they will alternately enter said delivery chute.

3. An orienting mechanism for dished articles according to claim 1 wherein said means to constrain said articles against self-discharge comprises a spring adjacent the top of each discharge opening in overlapping relation to the upper edge of an article when aligned with said openings.

4. An orienting mechanism for dished articles according to claim 1 wherein means is provided to agitate the articles in said hopper and thereby direct them in succession to said delivery chute.

5. An orienting mechanism for dished articles according to claim 4 wherein means is provided to agitate the articles in said hopper and comprises a hopper side consisting of three sections hinged together, the top edge thereof being hingedly mounted and the bottom edge thereof being hingedly mounted adjacent a side of said delivery chute, and means is provided for oscillating the section of said hopper side adjacent said delivery chute between substantially horizontal and substantially vertical attitudes.

6. An orienting mechanism for dished articles according to claim 4 wherein said means to agitate the articles comprises a hopper side consisting of three sections hinged together, the top edge thereof being hingedly mounted and the bottom edge thereof being hingedly mounted adjacent a side of said delivery chute, and means is provided for actuating said knockers so that they alternately enter said delivery chute and for oscillating the section of said hopper side adjacent said delivery chute between substantially horizontal and substantially vertical attitudes.

7. An orienting mechanism for dished articles according to claim 5 wherein said last means comprises a pair of rock shafts on which said knockers are mounted, an arm on one of the said rock shafts, and a pin and slot connection between said arm and said section of said hopper side adjacent said delivery chute.

8. An orienting mechanism for dished articles according to claim 2 wherein said last mentioned means comprises a pair of rock shafts on which said knockers are mounted, and means for simultaneously rocking said rock shafts in the same direction, so that when rocked one way one of said knockers enters one side of said delivery chute, and when rocked the other way the other of said knockers enters the opposite side of said delivery chute.

9. An orienting mechanism for dished articles according to claim 8 wherein said means for rocking said rock shafts comprises levers mounted on said shafts, a roller carried by each of said levers and a cam between said rollers, said rollers simultaneously engaging substantially diametrically opposite sides of said cam and means for rotating said cam.

10. An orienting mechanism for dished articles according to claim 1 wherein a conveyor is provided on one side of said delivery chute for the articles which are knocked to that side, a second conveyor is provided on the opposite side of said delivery chute for the articles which are knocked toward that side, and a collecting chute is provided to receive the articles from both conveyors and has converging sides terminating in a trough which receives the articles in single file.

11. In an orienting mechanism for dished articles having off-center wall elements, a hopper adapted to receive a plurality of said articles, a delivery chute extending downwardly from the bottom of said hopper and down which the articles successively gravitate in vertical attitude, opposite discharge openings in said delivery chute slightly larger than the diameters of said articles, means to stop an article in substantial alignment with said opposite discharge openings, means to constrain said articles against self-discharge from either of said openings, and means for extracting said articles arriving at said opposite discharge openings through one or the other thereof comprising a pair of vacuum cups, one at each side of said delivery chute and adapted to be moved into said delivery chute through one or the other of said openings, and adapted to engage by suction said off-center wall elements during back and forth movements of said vacuum cups, the limits of movement of said vacuum cups in said delivery chute being such that they will engage said off-center wall elements only when the dished sides of articles face away from said vacuum cups, said articles thereupon being pulled by said vacuum cups past said constraining means, chute walls against which said articles are engaged by said vacuum cups for disengaging the vacuum cups from the wall elements upon continued movement of the vacuum cups in an article-extracting direction, and a pair of chutes adapted to receive the articles extracted from the two sides of said delivery chute.

12. An orienting mechanism for dished articles according to claim 11 wherein vacuum valves are provided for connecting said vacuum cups to a vacuum source and are actuated in timed relation to the movements of said vacuum cups so that the vacuum is effective at the cups during that part of their movement only from pick-up position to release position.

13. An orienting mechanism for dished articles according to claim 11 wherein said pair of chutes having spiral portions for reversing the orientation of the articles from one of said chutes with respect to the articles from the other of said chutes.

References Cited

UNITED STATES PATENTS

| | | | |
|---|---|---|---|
| 736,622 | 8/1903 | Olin | 221—171 X |
| 2,023,561 | 12/1935 | Williams et al. | |
| 2,270,713 | 1/1942 | Belada | 198—33 |

EVON C. BLUNK, *Primary Examiner.*

R. J. HICKEY, *Assistant Examiner.*